June 19, 1951  F. A. SCHNEIDER  2,557,615
ALKALINE BATTERY
Filed Jan. 5, 1949
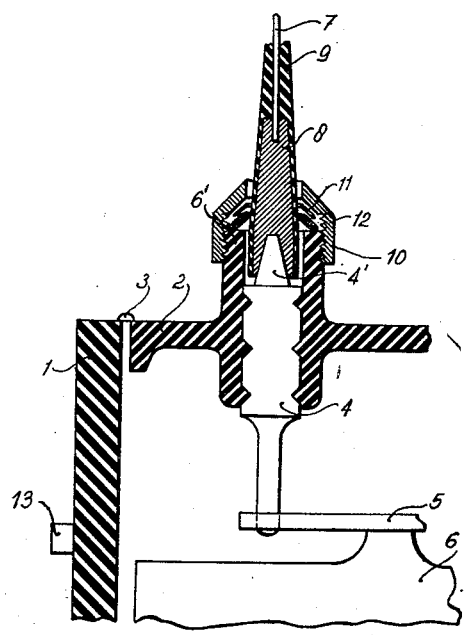
Inventor:
Friedrich A. Schneider,
By Pierce, Scheffler & Parker,
Attorneys.

Patented June 19, 1951

2,557,615

UNITED STATES PATENT OFFICE 2,557,615

ALKALINE BATTERY

Friedrich August Schneider, Venlo, Netherlands, assignor to Accumulatoren Fabriek Varta N. V., Amsterdam, Netherlands, a company of the Netherlands Application January 5, 1949, Serial No. 69,401
In the Netherlands July 17, 1947

2 Claims. (Cl. 136—168)

This invention relates to improvements in the structure of alkaline battery cells and to batteries of such cells, and more particularly is concerned with a certain novel construction of the poles and lid of an alkaline battery cell.

It is known, when using alkaline batteries, both those of the Edison type and those of the Jungner type, to place the plates in cells of which both the containers and the lids consist of synthetic material which is not attacked by the alkali. As such synthetic material there may be used plastics, e. g. polystyrene, polyvinyl chloride or polyamide, as well as special kinds of ebonite which do not transmit any sulphur to the alkali. The use of such synthetic materials makes it possible to carry out the closure of each cell, i. e., the connection between the cell container and the cell lid, by sealing, welding or vulcanization. Thus, an enclosure for the plates will be obtained which is completely impervious to alkali. When a number of cells are assembled to form a battery, they are placed in a steel container the inner walls of which are coated with rubber, a synthetic material or other suitable material.

This known construction gives rise to difficulties. The lids, the poles of the cells and the connections between these poles cannot be cleaned without the use of water. It is unavoidable that a portion thereof, mixed with some alkali, should be left on the said members and also be deposited on the bottom of the battery container, where it cannot be removed, while it cannot dry for lack of proper ventilation. The consequence is that between the poles and the connections leakage paths are formed, which result in losses and other detrimental phenomena.

According to the invention, when using an alkaline battery cell, the cell container and the cell lid of which consist of a synthetic material which makes it possible to carry out the closure of the cell by a sealing, welding or vulcanizing process, the poles are incorporated in the lid by a molding, casting, pressing or vulcanizing process in such a manner that the end of each pole is surrounded by a threaded bushing or tubular part of the lid.

Further, according to the invention, the connection with the poles is brought about by connectors coated with rubber or a synthetic material, the terminals of said connectors carrying a connecting member fitting to the end of the pole, while the connectors are pressed against the pole through the medium of sealing means with the aid of a screw-cap screwed onto the tubular part of the lid.

In this way both the poles and the connectors are enclosed in a completely liquid-tight manner, so that the difficulties above referred to are obviated. The cells can now be freely cleaned with water and brushed, if required, because the water cannot come into contact with any conducting part of the cell or the connectors. This is a very great advantage, which may also be expressed in the statement that the construction of the cell according to the invention is the first to be fundamentally suitable for a space-saving assembly of a number of cells to form a battery. The known cells—also other types than those with containers and lids of synthetic resin, e. g., cells with metal containers coated with rubber or other material almost up to the lid, or cells with metal containers surrounded first by a paraffin-impregnated cardboard covering and then by a thin rubberbag— are not suitable for this purpose. In view of this the invention provides a great technical and economic improvement.

When, according to the invention, a number of cells are combined to form a battery, it is advisable not to place these cells in the known manner in a battery tank, but rather to place them in a supporting frame built up of steel frame bars and in which the cells are maintained at some distance from each other by means of fixed or loose spacing members, e. g. ridges. This produces the advantage that besides the cleaning possibility of the cells their ventilation is also improved. In fact, when cells with cell containers and cell lids of synthetic material have to be used under conditions of heavy load, difficulties may be caused by the fact that the temperature rises too rapidly, when said cells are conventionally assembled into a battery. These difficulties are obviated by the use of said supporting frame. Moreover, the use of this supporting frame also greatly reduces the weight of the battery, while at the same time the cost is reduced. The bars of the supporting frame are preferably coated with rubber or a synthetic material in order to prevent damage to the cell containers owing to jolting or vibration of the battery.

In order to protect the cells in the battery from mud, splashing water and other impurities, mudguards which do not impede the ventilation of the battery may be mounted around the supporting frame. These may readily be so constructed that they can be readily removed when the battery is to be cleaned.

The invention may be explained more in detail with reference to the accompanying drawing, the single figure of which shows a cross-section through a cell according to the invention on the axis of one of the poles, a connector being also shown.

The cell consists of a cell container 1 and a cell lid 2. These are made of synthetic material, polyvinyl chloride and polythene being illustrative examples, and may be joined, for example, by welding, as diagrammatically illustrated at 3.

The pole 4, which carries a battery plate or set of battery plates 6 by means of a connecting member 5, has been incorporated in the lid 3, e. g., by a molding or pressing operation. At that end of pole 4 which is remote from the cell plates there is provided a conical member 4'. The lid 2 is provided with a bushing or tubular part 6' which surrounds the conical end 4' of the pole and is externally screw-threaded. Connection with the pole is brought about by a connector composed of a conductor 7 and a connecting member 8 connected with conductor 7 and conically hollowed at the end remote from the latter, which connecting member fits to the end 4' of the pole 4. The exterior of the connector is coated with a layer 9 of rubber or synthetic material.

The tube 6' is equipped with a screwcap 10, while a slotted press-ring 11 and a packing ring 12 are provided between the inwardly directed collar of the said screwcap and the outer end of the tubular part 6'. In order to fix the connector to the pole, first the packing ring 12, subsequently the press-ring 11 and then the screwcap 10 are shoved onto the member 8. When the screwcap 10 is firmly screwed on the tubular part 6', a liquid-tight packing is formed between the tubular part and the connector coated with insulating material. When this has been accomplished, the cell may be freely cleaned with water without the risk that the latter may come into contact with any conductive part of the cell or the connector.

If desired, the exterior of the cell container may be provided with fixed spacing members, e. g. ridges or knobs, one of which has been illustrated at 13. These spacing members serve to keep the cells at some distance from each other when they are assembled to form a battery and, according to the invention, are placed in a supporting frame of coated steel frame bars. Instead of fixed spacing members, use may also be made of loose spacing ridges or equivalent members. The spacing members prevent moisture—which cannot evaporate for lack of ventilation—from being left between the cells.

In order to protect the battery from soiling from outside, the supporting frame is preferably provided with guards which do not impede the ventilation of the battery.

I claim:

1. An accumulator cell comprising a container, a plurality of plates within the container, a lid sealed to the container and including an upstanding bushing extending therethrough, a lead-out pole construction comprising a pole member secured to and extending through said bushing and forming with the latter a liquid-tight joint, the upper portion of which pole member is tapered, an insulated lead-out conductor, an insulated terminal member secured to said conductor said terminal member including a tapered end portion complementary to the taper on said pole member for engagement with the latter, a packing ring closely surrounding said terminal member and adapted, upon axial pressure being applied thereto, to contact said terminal member and the external end of the bushing, and a screwcap surrounding said terminal member and adapted for threaded engagement with the upper end of said bushing to apply axial pressure to said packing ring for sealing off the space between the upper end of said bushing and said terminal member.

2. An accumulator cell comprising a container, a plurality of plates within the container, a lid sealed to the container and including an upstanding bushing extending therethrough, a lead-out pole construction comprising a pole member secured to and extending through said bushing and engaging the inner surface of the latter to form therewith a liquid-tight joint, the upper portion of which pole member is tapered, an insulated lead-out conductor, an insulated terminal member secured adjacent one end thereof to said conductor said terminal member being tapered from its conductor-engaging end to its other end, the conductor-engaging end being the smaller of the two, and said terminal member including a tapered end portion complementary to the taper on said pole member for engagement with the latter, a packing ring closely surrounding said terminal member and adapted, upon axial pressure being applied thereto, to contact said terminal member and to contact the external end of the bushing, and a screwcap surrounding said terminal member and adapted for threaded engagement with the upper end of said bushing to apply axial pressure to said packing ring for pressing said terminal member against said pole member and for sealing off the space between the upper end of said bushing and said terminal member.

FRIEDRICH AUGUST SCHNEIDER.

REFERENCES CITED

The following references are of record in the file of this patent:

UNITED STATES PATENTS

| Number | Name | Date |
| --- | --- | --- |
| 1,611,908 | Harley et al. | Dec. 28, 1926 |
| 1,784,216 | Aldrich et al. | Dec. 9, 1930 |
| 2,002,037 | McKenna | May 21, 1935 |
| 2,131,066 | Obermaier | Sept. 27, 1938 |
| 2,132,793 | Kyle | Oct. 11, 1938 |
| 2,145,581 | Bright | Jan. 31, 1939 |
| 2,312,791 | Bahr | Mar. 2, 1943 |

FOREIGN PATENTS

| Number | Country | Date |
| --- | --- | --- |
| 7,337 | Great Britain | Sept. 10, 1903 |